United States Patent
Zhang et al.

(10) Patent No.: US 9,564,995 B2
(45) Date of Patent: Feb. 7, 2017

(54) RETRANSMISSION METHOD FOR TIME DIVISION DUPLEXING SELF-ADAPTIVE FRAME STRUCTURE, AND NETWORK SIDE DEVICE

(75) Inventors: Xiaobo Zhang, Shenzhen (CN); Bin Yu, Shenzhen (CN); Wenfeng Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 114 days.

(21) Appl. No.: 14/385,685

(22) PCT Filed: Jun. 25, 2012

(86) PCT No.: PCT/CN2012/077414
§ 371 (c)(1),
(2), (4) Date: Sep. 16, 2014

(87) PCT Pub. No.: WO2013/135018
PCT Pub. Date: Sep. 19, 2013

(65) Prior Publication Data
US 2015/0043393 A1    Feb. 12, 2015

(30) Foreign Application Priority Data
Mar. 16, 2012    (CN) .......................... 2012 1 0071511

(51) Int. Cl.
*H04J 3/00* (2006.01)
*H04L 1/08* (2006.01)
(Continued)

(52) U.S. Cl.
CPC ............... *H04L 1/08* (2013.01); *H04B 7/2656* (2013.01); *H04L 1/1861* (2013.01);
(Continued)

(58) Field of Classification Search
None
See application file for complete search history.

(56) References Cited

U.S. PATENT DOCUMENTS

| 2011/0310830 A1 | 12/2011 | Wu et al. | |
| 2013/0034028 A1* | 2/2013 | Chen | H04L 1/1854 370/280 |
| 2013/0194980 A1* | 8/2013 | Yin | H04L 1/1854 370/280 |

FOREIGN PATENT DOCUMENTS

| CN | 101662833 | 3/2010 |
| CN | 102223722 | 10/2011 |
| EP | 2424288 | 2/2012 |
| WO | 2010092474 | 8/2010 |

OTHER PUBLICATIONS

3GPP TSG RAN WG1 Meeting #68, Dresden, Germany, Feb. 6-10, 2012; Performance Evaluation of LTE TDD DL-UL reconfiguration in accordance with traffic adaption; 6 pages.
(Continued)

*Primary Examiner* — Jutai Kao
(74) *Attorney, Agent, or Firm* — Thomas | Horstemeyer, LLP (57) ABSTRACT

A retransmission method for a time division duplexing self-adaptive frame structure, and a network side device relate to a technology of dynamically allocating uplink and downlink sub-frames in an LTE-advance (3GPP Release11) TDD communication system. The method comprises: during transmission of a TDD self-adaptive frame, for an uplink sub-frame, if a frame structure, of which an RTT period of PHICH and PUSCH of the uplink sub-frame is 10 ms, corresponding to the uplink sub frame is found in 7 types of defined frame structures, then sending PHICH data on a corresponding downlink sub-frame in the found frame structure, and sending retransmission data on the corresponding uplink sub-frame in the found frame structure. The solution ensures HARQ compatibility of an uplink data channel of R10UE. In addition, A/N feedback of the PDSCH is configured according to the uplink A/N resolution, thereby improving retransmission performance.

12 Claims, 4 Drawing Sheets

(51) Int. Cl.
    *H04B 7/26*     (2006.01)
    *H04L 5/14*     (2006.01)
    *H04W 72/04*     (2009.01)
    *H04W 76/04*     (2009.01)
    *H04L 1/18*     (2006.01)
    *H04L 5/00*     (2006.01)
    *H04W 88/02*     (2009.01)

(52) U.S. Cl.
    CPC ............ *H04L 1/1893* (2013.01); *H04L 5/003* (2013.01); *H04L 5/14* (2013.01); *H04W 72/042* (2013.01); *H04W 76/046* (2013.01); *H04L 1/1812* (2013.01); *H04L 1/1854* (2013.01); *H04L 5/0053* (2013.01); *H04W 88/02* (2013.01)

(56) References Cited

OTHER PUBLICATIONS

3GPP TS 36.213 3rd Generation Partnership Project; Technical Specification Group Radio Access Network; Evolved Universal Terrestrial Radio Access; Dec. 2011; 126 pages.

3GPP TS 36.211 3rd Generation Partnership Project; Technical Specification Group Radio Access Network; 102 pages. Dec. 2011.

English translation of the abstract for CN 101662833 published Mar. 3, 2010.

English translation of the abstract for CN 102223722 published Oct. 19, 2011.

\* cited by examiner

RETRANSMISSION METHOD FOR TIME DIVISION DUPLEXING SELF-ADAPTIVE FRAME STRUCTURE, AND NETWORK SIDE DEVICE

TECHNICAL FIELD

The present document relates to a technology of dynamically allocating uplink and downlink sub-frames in an LTE-advance (3GPP Release11) TDD communication system, and in particular, to a timing sequence configuration scheme for a time division duplexing (TDD) self-adaptive frame structure.

BACKGROUND OF THE RELATED ART

In the LTE and the LTE-A standards, the system frame of the TDD is made up of ten sub-frames. The 3GPP supports a total of 7 kinds of frame structure together, as shown in Table 1.

TABLE 1 uplink and downlink frame structures of the TDD system

| Serial numbers for uplink | Switching point period from downlink to uplink | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In the current 3GPP standard, system information SIB-I is used to inform the UE of the frame structure configured for the current serving cell. According to the existing standard, the minimum change period of the SIB information is 640 ms. In pre-research project of the "Dynamic TDD frame structure" formally approved by the 3GPP in the RAN54 (December of 2011) plenary session, it becomes possible to allocate the frame structures of the TDD system more dynamically. Shortening the change period of the frame structure of the TDD system can take full advantage of the characteristics of the TDD to support the transmission of the anti-symmetrical service.

But there is no specific scheme on how to set the retransmission of the downlink data frame. In addition, in the process of the uplink synchronization HARQ, how to retransmit the PUSCH to avoid the conflict with the R10 UE needs a further solution as well.

SUMMARY

The technical problem that the embodiment of the present document requires to solve is how to configure the A/N feedback of the Physical Downlink Shared Channel (PDSCH) according to the uplink A/N resolution and how to ensure the Hybrid Automatic Repeat Request (HARQ) compatibility with the uplink data channel of the R10UE. Therefore, the present document provides a retransmission method for a time division duplexing self-adaptive frame structure and a network side device.

In order to solve the above-mentioned technical problem, the embodiment of the present document discloses a retransmission method for a time division duplexing (TDD) self-adaptive frame structure, comprising:

during transmission of a TDD self-adaptive frame, for an uplink sub-frame, if a frame structure, of which a round trip time (RTT) period of a Physical Hybrid Indicator Channel (PHICH) and a Physical Uplink Shared Channel (PUSCH) is 10 ms, corresponding to the uplink sub frame is found in 7 types of defined frame structures, then sending PHICH data on a corresponding downlink sub-frame in the found frame structure, and sending retransmission data on a corresponding uplink sub-frame in the found frame structure.

Preferably, the method further comprises:
if the frame structure, of which the RTT period of the PHICH and the PUSCH of the uplink sub-frame is 10 ms, corresponding to the uplink sub frame is not found:
newly defining a frame structure of which the RTT period is 10 ms or an integral multiple of 10 ms, sending the PHICH data on a corresponding downlink sub-frame in the newly defined frame structure, and sending the retransmission data on a corresponding uplink sub-frame in the newly defined frame structure; wherein, the newly defined frame structure is a frame structure which is not conflicted with every sub-frame in the 7 types of defined frame structures.

Preferably, the method further comprises:
if the frame structure, of which the RTT period of the PHICH and the PUSCH of the uplink sub-frame is 10 ms, corresponding to the uplink sub frame is not found:
transmitting only new uplink data on the uplink sub-frame; or
configuring the uplink sub-frame as the downlink sub-frame.

Preferably, the method further comprises:
for the downlink sub-frame, finding an uplink sub-frame which is nearest to the downlink sub-frame from a timing sequence relationship of the 7 types of defined frame structures, and if a number of Physical Downlink Shared Channels (PDSCH) related to the found uplink sub-frame is no more than 4, then feeding back an acknowledgement/negative acknowledgement (A/N) response on the uplink sub-frame;

if the number of the PDSCHs related to the found uplink sub-frame is greater than 4, then feeding back the A/N on the uplink sub-frame, which satisfies that is nearest to the found uplink sub-frame in the timing sequence relationship of the 7 types of defined frame structures and the number of the related PDSCHs is no more than 4, after the found uplink sub-frame.

Preferably, the method further comprises:
if the uplink sub-frame, which satisfies that is nearest to the found uplink sub-frame in the timing sequence relationship of the 7 types of defined frame structures and the number of the related PDSCHs is no more than 4, after the found uplink sub-frame does not exist, then feeding back the A/N on the found uplink sub-frame.

Preferably, the method further comprises:
during the above-mentioned transmission of the TDD self-adaptive frame structure, a network side semi-statically notifying a user equipment (UE) to enter a self-adaptive frame structure switchover state through a Radio Resource control protocol (RRC) signaling, and the UE receiving the RRC signaling and performing data operation according to a predefined timing sequence relationship; or
the network side notifying the dynamically configured time sequence relationship of every sub-frame through a set dynamic signaling to the UE, and the UE performing the data operation according to the sequential relationship of every sub-frame in the set dynamic signaling which is received.

The embodiment of the present document also discloses a retransmission method for a time division duplexing (TDD) self-adaptive frame structure, comprising:

during transmission of a TDD self-adaptive frame, for a downlink sub-frame, finding an uplink sub-frame which is nearest to the downlink sub-frame from a time sequence relationship of 7 types of defined frame structures, and if a number of Physical Downlink Shared Channels (PDSCH) related to the found uplink sub-frame is no more than 4, then feeding back an acknowledgement/negative acknowledgement (A/N) response on the uplink sub-frame;

if the number of the PDSCHs related to the found uplink sub-frame is greater than 4, then feeding back the A/N on the uplink sub-frame, which satisfies that is nearest to the found uplink sub-frame in the time sequence relationship of the 7 types of defined frame structures and the number of the related PDSCHs is no more than 4, after the found uplink sub-frame.

Preferably, the method further comprises:

if the uplink sub-frame, which satisfies that is nearest to the found uplink sub-frame in the time sequence relationship of the 7 types of defined frame structures and the number of the related PDSCHs is no more than 4, after the found uplink sub-frame does not exist, then feeding back the A/N on the found uplink sub-frame.

Preferably, the method further comprises:

during the above-mentioned transmission of the TDD self-adaptive frame structure, a network side semi-statically notifying a user equipment (UE) to enter a self-adaptive frame structure switchover state through a Radio Resource control (RRC) protocol signaling, and the UE receiving the RRC signaling and performing data operation according to a predefined time sequence relationship; or the network side notifying dynamically configured time sequence relationship of every sub-frame through a set dynamic signaling to the UE, and the UE performing the data operation according to the time sequence relationship of every sub-frame in the set dynamic signaling which is received.

The embodiment of the present document also discloses a network side device, comprising:

a first module, configured to: during transmission of a TDD self-adaptive frame, for an uplink sub-frame, find a frame structure, of which a round trip time (RTT) period of a Physical Hybrid Indicator Channel (PHICH) and a Physical Uplink Shared Channel (PUSCH) is 10 ms, corresponding to the uplink sub-frame from 7 types of defined frame structures; and a second module, configured to send PHICH data on a corresponding downlink sub-frame in the frame structure found by the first module, and receive retransmission data on the corresponding uplink sub-frame in the found frame structure.

Preferably, in the above mentioned device, the first module is further configured to: if the frame structure, of which the RTT period of the PHICH and the PUSCH of the uplink sub-frame is 10 ms, corresponding to the uplink sub frame is not found, newly define a frame structure of which the RTT period is 10 ms or an integral multiple of 10 ms, wherein, the newly defined frame structure is a frame structure which is not conflicted with every sub-frame in the 7 types of defined frame structures; and the second module is further configured to: send the PHICH data on a corresponding downlink sub-frame in the frame structure newly defined by the first module, and receive the retransmission data on a corresponding uplink sub-frame in the newly defined frame structure.

Preferably, in the above mentioned device, the first module is further configured to: if the frame structure, of which the RTT period of the PHICH and the PUSCH of the uplink sub-frame is 10 ms, corresponding to the uplink sub frame is not found, further configure the uplink sub-frame as the downlink sub-frame; or configure transmitting only new uplink data on the uplink sub-frame.

Preferably, the device further comprises:

a third module, configured to: notify semi-statically a user equipment (UE) to enter a self-adaptive frame structure switchover state through a Radio Resource control protocol (RRC) signaling, to make the UE perform data operation according to a predefined time sequence relationship; or notify a dynamically configured time sequence relationship of every sub-frame through a set dynamic signaling to the UE.

Preferably, the device further comprises:

a fourth module, configured to: for the downlink sub-frame, find an uplink sub-frame which is nearest to the downlink sub-frame from a time sequence relationship of the 7 types of defined frame structures;

a fifth module, configured to: if a number of Physical Downlink Shared Channels (PDSCH) related to the found uplink sub-frame is no more than 4, then feed back an acknowledgement/negative acknowledgement (A/N) response on the uplink sub-frame; and a sixth module, configured to: if the number of the PDSCHs related to the uplink sub-frame found by the fourth module is greater than 4, find the uplink sub-frame, which satisfies that is nearest to the found uplink sub-frame in the time sequence relationship of the 7 types of defined frame structures and the number of the related PDSCHs is no more than 4, after the uplink sub-frame found by the fourth module, and receive the A/N on the uplink sub-frame.

Preferably, in the above mentioned device, the sixth module is further configured to: if the uplink sub-frame, which satisfies that is nearest to the found uplink sub-frame in the time sequence relationship of the 7 types of defined frame structures and the number of the related PDSCHs is no more than 4, after the uplink sub-frame found by the fourth module does not exist, then receive the A/N on the uplink sub-frame found by the fourth module.

The technical scheme of the present application ensures the HARQ compatibility of the uplink data channel of the R10UE. In addition, the A/N feedback of the PDSCH is configured according to the uplink A/N resolution, thereby improving the retransmission performance.

PREFERRED EMBODIMENTS OF THE PRESENT INVENTION

The embodiment of the present document is described in detail with reference to the accompanying drawings hereinafter. It should be illustrated that, in the case of not conflicting, the embodiments in the present application and features in these embodiments can be combined with each other.

Embodiment 1

The applicant proposes that, in frame structure configuration based on that the sub-frame is the minimum allocation unit, the frame structure allocation can give priority to the acknowledgement/negative acknowledgement (A/N) response resolution. This needs to set the retransmission of the downlink data frame according to the A/N resolution. The applicant still considers that the existing standard supports two modes, the A/N multiplexing and the binding. When the number of the PDSCH corresponding to one Physical Uplink Control CHannel (PUCCH) is no more than 4, then both the multiplexing and the binding are supported. When the number of the PUCCH corresponding to one PDSCH is greater than 4, only the binding is supported. Wherein, the multiplexing mode takes up more resources, but its resolution is higher and can improve the retransmission efficiency even more. Because of this, the applicant proposes a retransmission method for a TDD self-adaptive frame structure, and the method includes the following steps.

During transmission of a TDD dynamic frame, for a downlink sub-frame of the current frame, an uplink sub-frame which is nearest to the downlink sub-frame is found from a time sequence relationship of 7 types of defined frame structures, and if the number of the PDSCH related to the found uplink sub-frame is no more than 4, then the A/N is fed back on the uplink sub-frame;

if the number of the PDSCHs related to the found uplink sub-frame is greater than 4, then the A/N is fed back on the uplink sub-frame which satisfies that is nearest to the found uplink sub-frame in the time sequence relationship of the 7 types of defined frame structures and the number of the related PDSCHs is no more than 4 after the found uplink sub-frame.

In addition, if the number of the PDSCHs related to the found uplink sub-frame is greater than 4 and if the uplink sub-frame which satisfies that is nearest to the found uplink sub-frame in the time sequence relationship of the 7 types of defined frame structures and the number of the related PDSCHs is no more than 4 after the found uplink sub-frame does not exist, then the A/N is fed back on the found uplink sub-frame.

It can be summarized from the above-mentioned scheme, in the transmission procedure of the TDD self-adaptive frame structure in the present application, for the uplink A/N of the PDSCH, the HARQ timing relation needs to observe the following criterion:

A: selecting the uplink sub-frame which is nearest to the PDSCH sub-frame in the time sequence relationship of 7 types of defined frame structures and of which the number of the related PDSCH is no more than 4.

B: if the number of the PDSCH related to the uplink sub-frame which is nearest to the PDSCH sub-frame in the time sequence relationship of 7 types of defined frame structures is no more than 4, the following two criteria are based on:

B1, selecting the uplink sub-frame which satisfies that is nearest to the uplink sub-frame nearest to the PDSCH sub-frame in the 7 types of defined time sequence relationship and the number of the related PDSCHs is no more than 4 after the uplink sub-frame nearest to the PDSCH sub-frame (that is, the uplink sub-frame nearest to the PDSCH sub-frame in the time sequence relationship of the 7 defined frame structures, abbreviated as the uplink sub-frame nearest to the PDSCH sub-frame hereinafter).

B2, if there is no uplink sub-frame which satisfies that is nearest to the uplink sub-frame nearest to the PDSCH sub-frame in the 7 types of defined time sequence relationship and the number of the related PDSCHs is no more than 4 after the uplink sub-frame nearest to the PDSCH sub-frame, the uplink sub-frame nearest to the PDSCH sub-frame (that is, the uplink sub-frame nearest to the PDSCH sub-frame in the time sequence relationship of the 7 defined frame structures), at this moment, the number of the PDSCH related to the selected uplink sub-frame is greater than 4. But it needs to be illustrated that, although now the number of the PDSCH related to the selected uplink sub-frame is greater than 4, and the A/N needs to be fed back by the bound mode, the number of the A/N corresponding to the PDSCH channel bound in the present embodiment is still smaller than the number of the A/N bound in the related art, that is, the present embodiment solves the problem of feeding back the A/N well, and improves the system performance.

In addition, during the above-mentioned transmission of the TDD dynamic frame, a network side notifies semi-statically a user equipment (UE) to enter a self-adaptive frame structure switchover state through a Radio Resource control protocol (RRC) signaling, and in this way the UE can perform the data operation according to a predefined time sequence relationship after receiving the notification; or the network side notifies the dynamically configured time sequence relationship of every sub-frame through a set dynamic signaling to the UE, and the UE performs the data operation according to the time sequence relationship of every sub-frame in the dynamic signaling.

The retransmission procedure of the present embodiment is further explained by combining with the accompanying drawings hereinafter.

Figure 1:
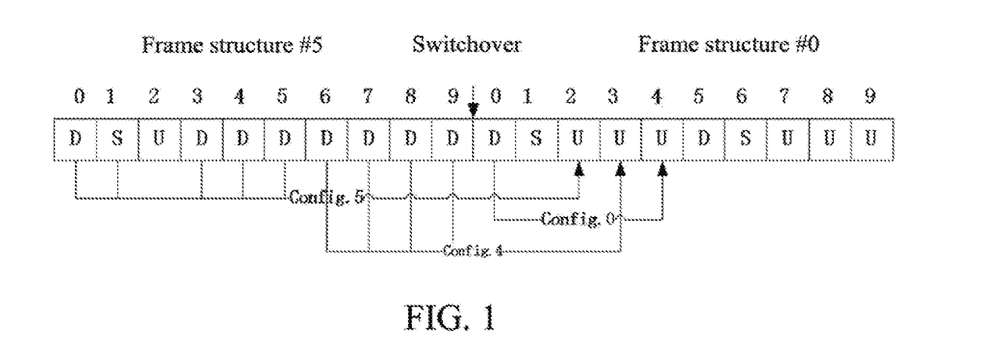
FIG. 1 is a diagram of an uplink A/N sequential relationship switching from a frame structure 5 to a frame structure 0 of the present embodiment.

As shown in FIG. 1, when the frame structure #5 is switched to the frame structure #0, the sub-frame 0/1/3/4 in the frame structure #5 follows the HARQ time sequence relationship of the frame structure #5. As to the sub-frame 5, because there is no other appropriate HARQ time sequence that has already been defined, the sub-frame also needs to follow the HARQ time sequence of the frame structure #5. The sub-frame 6/7/8/9 follows the HARQ time sequence of the frame structure #4. Compared with the traditional HARQ time sequence, the sub-frame 6/7/8 can be related to the next sub-frame 3, thus avoiding the performance loss caused by adopting only the A/N binding. The sub-frame 9 is also related to the next sub-frame 3, which avoids the delay brought by the uplink sub-frame after it is related to the sub-frame 12. In addition, for the sub-frame 0/1/3/4/5 in the frame structure #5, although it can only adopt the A/N binding, the number of the bound sub-frames is reduced by 3 when compared with the frame structure #5, thus improving the performance.

Embodiment 2

Figure 2:
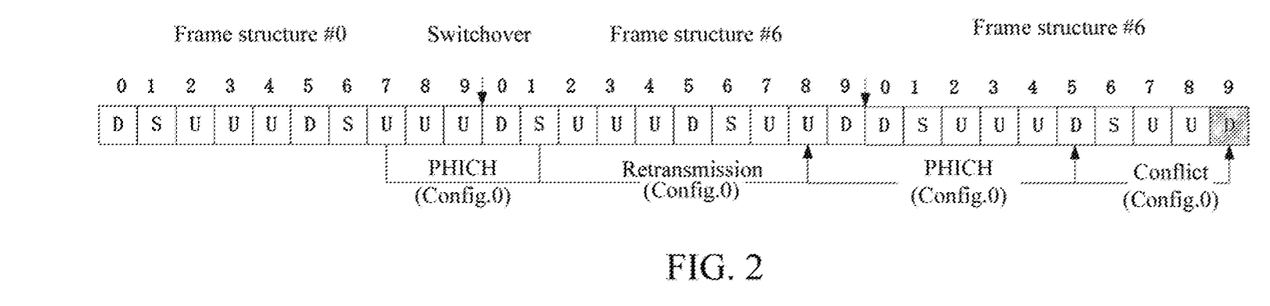
FIG. 2 is a diagram of a sub-frame conflict in a current self-adaptive frame structure allocation.

The applicant also finds that when an error occurs in the transmission by adopting a synchronous non self-adaptive HARQ that is, the Physical Uplink Shared Channel (PUSCH), in the current standard, its retransmission needs to be in the predefined sub-frame. In the self-adaptive frame structure configuration, the predefined frame structure will bring the time sequence conflict. FIG. 2 shows a conflict scene, and in order to avoid the conflict, the sub-frame 7 cannot be allocated for the R10UE transmission. Similarly, almost all uplink sub-frames cannot be allocated to the R10UE. A potential solution is that, when the conflict takes place, the conflict sub-frame configuration is configured to the uplink sub-frame from the downlink sub-frame. However, the method has the following risks.

The gain of the self-adaptive frame structure is reduced. The probability of uplink retransmission is usually greater than the probability of the downlink retransmission, and too much retransmission will cause a lot of downlink sub-frames unable to transmit the downlink data, thus unable to satisfy the demand of the system for burst data.

The Physical Hybrid Indicator Channel (PHICH) resources are conflicted. Assuming that the UE of the R11 can know the self-adaptive frame structure of the next frame, then the location of the PHICH corresponding to its PUSCH is stationary; if the sub-frame to which the PHICH belongs is configured as the uplink frame because of the conflict, then it will cause that the PHICH do not have the resources for transmission.

The scheduling complexity at the eNB side is increased. The eNB can only confirm its retransmission sub-frame is uplink or downlink after demodulating the PUSCH (that is, the corresponding PHICH sub-frame). That is, the eNB needs to finish the scheduling of two kinds (or multiple kinds of) candidate frame structures.

So, based on the above-mentioned analysis, the applicant provides a retransmission method for the TDD self-adaptive frame structure in the present embodiment, and proposes that the method provides a relatively stationary particular time sequence relationship based on the sub-frame. Specifically, the method includes the following operations.

During the transmission of the TDD dynamic frame, for the uplink sub-frame, if the frame structure, of which the round trip time (RTT) period corresponding to the PHICH and the subsequent PUSCH retransmission of the uplink sub-frame is 10 ms, is found in 7 types of defined frame structures, then the PHICH data are sent on the corresponding downlink sub-frame in the found frame structure, and the retransmission data are sent on the corresponding uplink sub-frame in the found frame structure.

If the frame structure, of which the RTT period corresponding to the PHICH and the subsequent PUSCH retransmission of the uplink sub-frame is 10 ms, is not found in the 7 types of defined frame structures, then any of the following operations can be adopted.

The first operation is to newly define a frame structure of which the RTT period is 10 ms or an integral multiple of 10 ms, which is not supported by the existing standard but is not conflicted with other sub-frame, and to send the PHICH data on the downlink sub-frame corresponding to the frame structure in the newly defined RTT period, and send the retransmission data on the uplink sub-frame corresponding to the frame structure in the newly defined RTT period. For example: for the sub-frame 9 of the frame structure #0 in FIG. 2, the RTT of 10 ms can be defined, that is, the PUSCH→PHICH interval is 6 ms, and the PHICH→PUSCH interval is 4 ms.

The second operation is to configure the uplink sub-frame unable to perform the synchronous non self-adaptive retransmission of the uplink data, and transmit only new uplink data on the uplink sub-frame.

The third operation is to configure the uplink sub-frame as the downlink sub-frame.

Specifically, the uplink sub-frame in the existing frame structure has the following several situations:

for the uplink sub-frame 2/7, it can follow the PHICH and the uplink retransmission configuration of the frame structure #1;

for the uplink sub-frame 4, it can follow the PHICH and the uplink retransmission configuration of the frame structure #3;

for the uplink sub-frame 3, if the current frame is not the frame structure #0, then it can follow the PHICH and the uplink retransmission configuration of the frame structure #1. If the current frame is the frame structure #0, then the sub-frame does not support the synchronous non self-adaptive retransmission.

For the uplink sub-frame 8, if the next frame is not the frame structure #0 and 6 #, then it can follow the PHICH and the uplink retransmission configuration of the frame structure #1. If the next frame is the frame structure #0 or #6, then the sub-frame does not support the synchronous non self-adaptive retransmission or newly defining the frame structure of the RTT of 10 ms or the integral multiple of 10 ms.

For the uplink sub-frame 9 (frame structure0), the sub-frame does not support the synchronous non self-adaptive retransmission or newly defining the frame structure of the RTT of 10 ms or the integral multiple of 10 ms, for example, the PUSCH→PHICH interval is 6 ms, and the PHICH→PUSCH interval is 4 ms.

It can be seen from the above-mentioned classification, the particular time sequence relationship based on the sub-frame can support most uplink sub-frames for the data retransmission, and it does not support the data retransmission only in less situation, and it also can be through defining the new RTT period which is not supported by the existing standard but is not conflicted at all.

The retransmission procedure of the present embodiment is further explained by combining with the accompanying drawings hereinafter.

Figure 3:
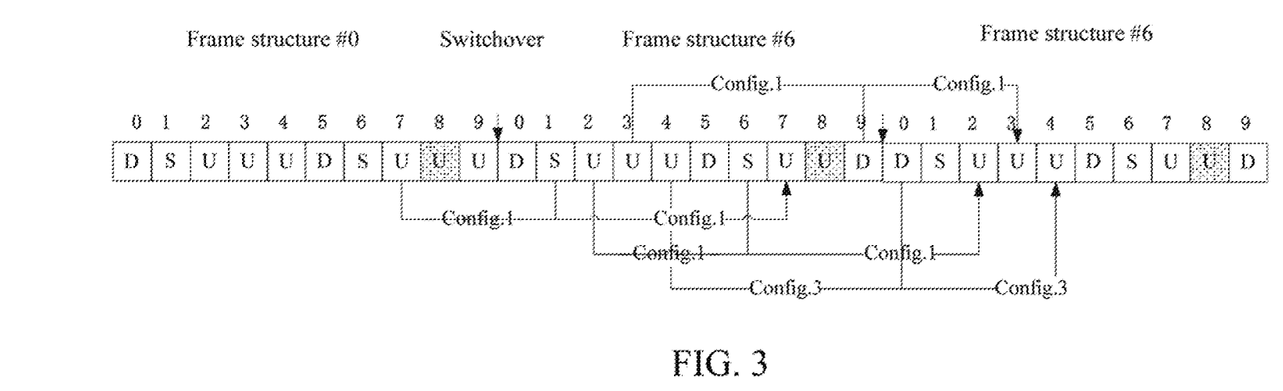
FIG. 3 is a diagram of a self-adaptive frame structure of an uplink data channel in the present embodiment.

As shown in FIG. 3, when the frame structure is jumped from #0 to #6, the sub-frame 2/3/7 follows the time sequence relationship of the frame structure #1, the sub-frame 4 follows the time sequence relationship of the frame structure #3, and the sub-frame 8 does not support the uplink data retransmission. Except sending the new PUSCH data, the sub-frame 8 can also be configured as the downlink sub-frame. Now the SIB message of the system can be indicated as the frame structure #1 (the R10 terminal is not scheduled in the sub-frame 8), and it will not produce the conflict with the R11 terminal.

Embodiment 3

The present embodiment provides a retransmission method for the TDD self-adaptive frame structure, and the method includes the operations of the above-mentioned embodiment 1 and embodiment 2. That is, during the transmission of the TDD dynamic frame in the present embodiment, for the uplink sub-frame, if the frame structure, of which the round trip time (RTT) period corresponding to the PHICH and the subsequent PUSCH retransmission of the uplink sub-frame is 10 ms, is found in 7 types of defined frame structures, then the PHICH data are sent on the corresponding downlink sub-frame in the found frame structure, and the retransmission data are sent on the corresponding uplink sub-frame in the found frame structure. While for the downlink sub-frame, the uplink sub-frame which is nearest to the downlink sub-frame is found from the time sequence relationship of the 7 types of defined frame structures, and if the number of the PDSCHs related to the found uplink sub-frame is no more than 4, then the A/N is fed back on the uplink sub-frame.

Wherein, for the uplink sub-frame, if the frame structure, of which the RTT period corresponding to the PHICH and the subsequent PUSCH retransmission of the uplink sub-frame is 10 ms, is unable to be found in the 7 types of defined frame structures, then any of the following operations can be adopted.

The first operation is to newly define a frame structure of which the RTT period is 10 ms or an integral multiple of 10 ms, which is not supported by the existing standard but is not conflicted with other sub-frame, and then send the PHICH data on the downlink sub-frame corresponding to the frame structure with the newly defined RTT period, and send the retransmission data on the uplink sub-frame corresponding to the frame structure the newly defined RTT period.

The second operation is that the uplink sub-frame is unable to perform the synchronous non self-adaptive retransmission of the uplink data, and only transmit the new uplink data.

The third operation is to configure the uplink sub-frame as the downlink sub-frame for processing. And for the downlink sub-frame, if the number of the PDSCHs related to the found uplink sub-frame nearest to the downlink sub-frame is greater than 4, then the A/N is fed back on the uplink sub-frame which satisfies that is nearest to the uplink sub-frame nearest to the downlink sub-frame in the time sequence relationship of the 7 types of defined frame structures after the uplink sub-frame nearest to the downlink sub-frame and the number of the related PDSCHs is no more than 4. However, when the uplink sub-frame which satisfies that is nearest to the uplink sub-frame nearest to the downlink sub-frame in the time sequence relationship of the 7 types of defined frame structures after the uplink sub-frame nearest to the downlink sub-frame and the number of the related PDSCHs is no more than 4 does not exist, the A/N can also be just fed back on the uplink sub-frame nearest to the downlink sub-frame.

The above-mentioned specific operations for the uplink sub-frame and the downlink sub-frame can refer to the corresponding description in embodiments 1 and 2, and will no longer go into details here.

Embodiment 3

Figure 4:
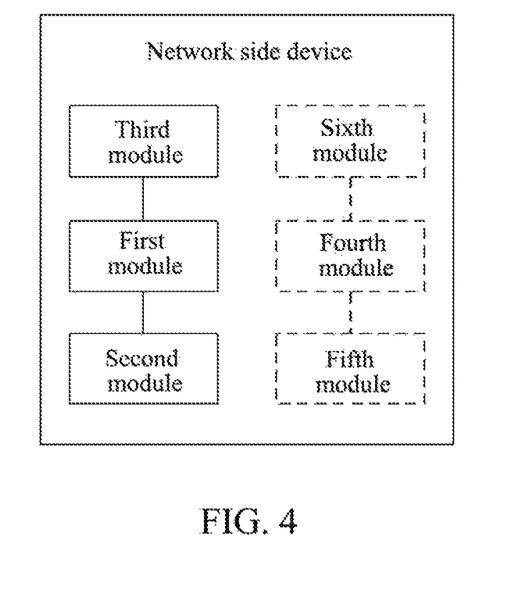
FIG. 4 is a structure diagram of a network side device of the present embodiment.

The present embodiment provides a network side device, as shown in FIG. 4, at least including a first module and a second module.

The first module is mainly configured to: during transmission of a TDD self-adaptive frame, for an uplink sub-frame, find a frame structure, of which a round trip time (RTT) period of a Physical Hybrid Indicator Channel (PHICH) and a Physical Uplink Shared Channel (PUSCH) is 10 ms, corresponding to the uplink sub-frame from 7 types of defined frame structures; and the second module is configured to send PHICH data on a corresponding downlink sub-frame in the frame structure found by the first module, and receive retransmission data on the corresponding uplink sub-frame in the found frame structure.

Wherein, the first module, if the frame structure of which the RTT period of the PHICH and the PUSCH of the uplink sub-frame is 10 ms corresponding to the uplink sub frame is not found, can newly define a frame structure of which the RTT period is 10 ms or an integral multiple of 10 ms. It should be illustrated that the newly defined frame structure is a frame structure which is not conflicted with every sub-frame in the 7 types of defined frame structures; and now the second module is further configured to: send the PHICH data on a corresponding downlink sub-frame in the frame structure newly defined by the first module, and receive the retransmission data on a corresponding uplink sub-frame in the newly defined frame structure.

For the situation that the frame structure, of which the RTT period of the PHICH and the PUSCH of the uplink sub-frame is 10 ms corresponding to the uplink sub frame is not found, the first module further configures the uplink sub-frame as the downlink sub-frame, or configures only transmitting new uplink data on the uplink sub-frame besides newly defining the frame structure of which the RTT period is 10 ms or an integral multiple of 10 ms.

In addition, the above-mentioned network side device can further includes a third module, configured to: mainly notify semi-statically a user equipment (UE) to enter a self-adaptive frame structure switchover state semi-statically through a Radio Resource control protocol (RRC) signaling, to make the UE perform data operation according to a predefined time sequence relationship; or notify a dynamically configured time sequence relationship of every sub-frame through a set dynamic signaling to the UE.

Besides the above-mentioned modules, the network side device can further includes a fourth, a fifth and a sixth module, and these modules are mainly the processes for the downlink sub-frame. Specifically, the description for the fourth, the fifth and the sixth module is as follows:

the fourth module is configured to: for the downlink sub-frame, find an uplink sub-frame which is nearest to the downlink sub-frame from a time sequence relationship of the 7 types of defined frame structures;

the fifth module is configured to: if a number of Physical Downlink Shared Channels (PDSCH) related to the found uplink sub-frame is no more than 4, then feed back an acknowledgement/negative acknowledgement (A/N) response on the uplink sub-frame; and the sixth module is configured to: if the number of the PDSCHs related to the uplink sub-frame found by the fourth module is greater than 4, find the uplink sub-frame which satisfies that is nearest to the found uplink sub-frame in the time sequence relationship of the 7 types of defined frame structures and the number of the related PDSCHs is no more than 4 after the uplink sub-frame found by the fourth module, and receive the A/N on the uplink sub-frame.

Wherein, the sixth module is further configured to: if the uplink sub-frame which satisfies that is nearest to the found uplink sub-frame in the time sequence relationship of the 7 types of defined frame structures and the number of the related PDSCHs is no more than 4 after the uplink sub-frame found by the fourth module does not exist, then receive the A/N on the uplink sub-frame found by the fourth module.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

It should be illustrated that the present document further can have a variety of other embodiments. Those skilled in the art can make the corresponding modifications and variations according to the present document without departing from the spirit and essence of the present document. And all of these modifications or the variations should be embodied in the scope of the appending claims of the present document.

INDUSTRIAL APPLICABILITY

The technical scheme of the present application ensures the HARQ compatibility of the uplink data channel of the R10UE. In addition, the A/N feedback of the PDSCH is configured according to the uplink A/N resolution, thereby improving the retransmission performance.

What we claim is:

1. A retransmission method for a time division duplexing (TDD) self-adaptive frame structure, the method comprising:
   during transmission of a TDD self-adaptive frame, for an uplink sub-frame, if a frame structure, of which a round trip time (RTT) period of a Physical Hybrid Indicator Channel (PHICH) and a Physical Uplink Shared Channel (PUSCH) is 10 ms, corresponding to the uplink sub frame is found in 7 types of defined frame structures, then sending PHICH data on a corresponding downlink sub-frame in the found frame structure, and sending retransmission data on a corresponding uplink sub-frame in the found frame structure; wherein
   the method further comprises: if the frame structure, of which the RTT period of the PHICH and the PUSCH of the uplink sub-frame is 10 ms, corresponding to the uplink sub frame is not found,
   newly defining a frame structure of which the RTT period is 10 ms or an integral multiple of 10 ms, or
   transmitting only new uplink data on the uplink sub-frame, or
   configuring the uplink sub-frame as the downlink sub-frame.

2. The method according to claim 1,
   wherein after newly defining the frame structure, the method further comprises: sending the PHICH data on a corresponding downlink sub-frame in the newly defined frame structure, and sending the retransmission data on a corresponding uplink sub-frame in the newly defined frame structure; wherein, the newly defined frame structure is a frame structure which is not conflicted with every sub-frame in the 7 types of defined frame structures.

3. The method according to claim 2, the method further comprising:
   for the downlink sub-frame, finding an uplink sub-frame which is nearest to the downlink sub-frame from a timing sequence relationship of the 7 types of defined frame structures, and if a number of Physical Downlink Shared Channels (PDSCH) related to the found uplink sub-frame is less than or equal to 4, then feeding back an acknowledgement/negative acknowledgement (A/N) response on the uplink sub-frame;
   if the number of PDSCHs related to the found uplink sub-frame is greater than 4, then feeding back the A/N on an uplink sub-frame that satisfies the timing sequence relationship of the 7 types of defined frame structures, that is after and nearest to the found uplink sub-frame, and that relates to PDSCHs whose number is less than or equal to 4.

4. The method according to claim 1, the method further comprising:
   for the downlink sub-frame, finding an uplink sub-frame which is nearest to the downlink sub-frame from a timing sequence relationship of the 7 types of defined frame structures, and if a number of Physical Downlink Shared Channels (PDSCH) related to the found uplink sub-frame is less than or equal to 4, then feeding back an acknowledgement/negative acknowledgement (A/N) response on the uplink sub-frame;
   if the number of PDSCHs related to the found uplink sub-frame is greater than 4, then feeding back the A/N on an uplink sub-frame that satisfies the timing sequence relationship of the 7 types of defined frame structures, that is after and nearest to the found uplink sub-frame, and that relates to PDSCHs whose number is less than or equal to 4.

5. The method according to claim 4, the method further comprising:
   if the uplink sub-frame that satisfies the timing sequence relationship of the 7 types of defined frame structures, that is after and nearest to the found uplink sub-frame, and that relates to PDSCHs whose number is less than or equal to 4, does not exist, then feeding back the A/N on the found uplink sub-frame.

6. The method according to claim 4, the method further comprising:
   during the above-mentioned transmission of the TDD self-adaptive frame structure, a network side semi-statically notifying a user equipment (UE) to enter a self-adaptive frame structure switchover state through a Radio Resource control protocol (RRC) signaling, and the UE receiving the RRC signaling and performing data operation according to a predefined timing sequence relationship; or
   the network side notifying dynamically configured time sequence relationship of every sub-frame through a set dynamic signaling to the UE, and the UE performing the data operation according to the sequential relationship of every sub-frame in the set dynamic signaling which is received.

7. A network side device, the device comprising hardware performing instructions stored in a non-transitory computer readable medium which executes steps in following modules:
   a first module, configured to: during transmission of a TDD self-adaptive frame, for an uplink sub-frame, find a frame structure, of which a round trip time (RTT) period of a Physical Hybrid Indicator Channel (PHICH) and a Physical Uplink Shared Channel (PUSCH) is 10 ms, corresponding to the uplink sub-frame from 7 types of defined frame structures; and
   a second module, configured to send PHICH data on a corresponding downlink sub-frame in the frame structure found by the first module, and receive retransmission data on the corresponding uplink sub-frame in the found frame structure; wherein
   the first module is further configured to: if the frame structure, of which the RTT period of the PHICH and the PUSCH of the uplink sub-frame is 10 ms, corresponding to the uplink sub frame is not found,
   newly define a frame structure of which the RTT period is 10 ms or an integral multiple of 10 ms, or
   transmit only new uplink data on the uplink sub-frame, or
   configure the uplink sub-frame as the downlink sub-frame.

8. The device according to claim 7, wherein the newly defined frame structure is a frame structure which is not conflicted with every sub-frame in the 7 types of defined frame structures; and the second module is further configured to: send the PHICH data on a corresponding downlink sub-frame in the frame structure newly defined by the first module, and receive the retransmission data on a corresponding uplink sub-frame in the newly defined frame structure.

9. The device according to claim 8, the device further comprising: a third module, configured to: notify semi-statically a user equipment (UE) to enter a self-adaptive frame structure switchover state through a Radio Resource control protocol (RRC) signaling, to make the UE perform data operation according to a predefined time sequence relationship; or notify a dynamically configured time sequence relationship of every sub-frame through a set dynamic signaling to the UE.

10. The device according to claim 7, the device further comprising:

a third module, configured to: notify semi-statically a user equipment (UE) to enter a self-adaptive frame structure switchover state through a Radio Resource control protocol (RRC) signaling, to make the UE perform data operation according to a predefined time sequence relationship; or notify a dynamically configured time sequence relationship of every sub-frame through a set dynamic signaling to the UE.

11. The device according to claim 10, the device further comprising:

a fourth module, configured to: for the downlink sub-frame, find an uplink sub-frame which is nearest to the downlink sub-frame from a time sequence relationship of the 7 types of defined frame structures;

a fifth module, configured to: if a number of Physical Downlink Shared Channels (PDSCH) related to the found uplink sub-frame is less than or equal to 4, then feed back an acknowledgement/negative acknowledgement (A/N) response on the uplink sub-frame; and a sixth module, configured to: if the number of PDSCHs related to the uplink sub-frame found by the fourth module is greater than 4, find an uplink sub-frame that satisfies the timing sequence relationship of the 7 types of defined frame structures, that is after and nearest to the uplink sub-frame found by the fourth module, that relates to PDSCHs whose number is less than or equal to 4, and on which the A/N is received by the sixth module.

12. The device according to claim 11, wherein, the sixth module is further configured to: if the uplink sub-frame that satisfies the timing sequence relationship of the 7 types of defined frame structures, that is after and nearest to the found uplink sub-frame, and that relates to PDSCHs whose number is less than or equal to 4, does not exist, then receive the A/N on the uplink sub-frame found by the fourth module.

* * * * *